United States Patent
Yabu et al.

(10) Patent No.: US 12,138,845 B2
(45) Date of Patent: Nov. 12, 2024

(54) MOLDED RESIN BODY PRODUCTION METHOD

(71) Applicant: DAIKIN INDUSTRIES, LTD., Osaka (JP)

(72) Inventors: Tadahiro Yabu, Osaka (JP); Hiroyuki Sendan, Osaka (JP); Tadaharu Isaka, Osaka (JP); Ryouichi Fukagawa, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 442 days.

(21) Appl. No.: 17/262,912

(22) PCT Filed: Jun. 6, 2019

(86) PCT No.: PCT/JP2019/022595
§ 371 (c)(1),
(2) Date: Jan. 25, 2021

(87) PCT Pub. No.: WO2020/021875
PCT Pub. Date: Jan. 30, 2020

(65) Prior Publication Data
US 2021/0276238 A1   Sep. 9, 2021

(30) Foreign Application Priority Data
Jul. 26, 2018   (JP) .................. 2018-140158

(51) Int. Cl.
*B29C 48/92*   (2019.01)
*B29B 7/42*   (2006.01)
(Continued)

(52) U.S. Cl.
CPC .............. *B29C 48/92* (2019.02); *B29B 7/428* (2013.01); *B29B 7/488* (2013.01); *B29B 7/582* (2013.01);
(Continued)

(58) Field of Classification Search
CPC .......... B29C 48/37; B29C 2948/92876; B29C 48/92; B29C 48/2552; B29C 2948/92019; B29B 7/488
See application file for complete search history.

(56) References Cited

U.S. PATENT DOCUMENTS 5,372,765 A    12/1994   Chen et al.
6,179,459 B1 *  1/2001   Kobayashi .............. B29B 7/488
                                        366/77
(Continued)

FOREIGN PATENT DOCUMENTS

JP   04-059220 A   2/1992
JP   06-328546 A   11/1994
(Continued)

OTHER PUBLICATIONS

Rebak, R. B. et al. "Corrosion Behavior of Nickel Alloys in Wet Hydrofluoric Acid." Materials and corrosion 52.4 (2001): 289-297. Web. (Year: 2001).*

(Continued)

*Primary Examiner* — Farah Taufiq
*Assistant Examiner* — Timothy G Hemingway
(74) *Attorney, Agent, or Firm* — Sughrue Mion, PLLC

(57) ABSTRACT

Provided is a method for producing a resin molded article, capable of reducing deterioration of resin during melt extrusion. The method includes passing a resin fed from a hopper for resin through a molding machine provided with the hopper, an extruder, and a pressure control device in this order, to produce a resin molded article, the resin pressure between a tip of the extruder and an inlet port for resin of the pressure control device being 15.0 MPa or lower.

8 Claims, 1 Drawing Sheet

(51) Int. Cl.
  *B29B 7/48* (2006.01)
  *B29B 7/58* (2006.01)
  *B29B 7/72* (2006.01)
  *B29C 48/04* (2019.01)
  *B29C 48/37* (2019.01)
  *B29K 27/00* (2006.01)
  *B29K 27/18* (2006.01)

(52) U.S. Cl.
  CPC .............. *B29B 7/726* (2013.01); *B29B 7/728* (2013.01); *B29C 48/04* (2019.02); *B29C 48/37* (2019.02); *B29C 2948/92514* (2019.02); *B29C 2948/926* (2019.02); *B29C 2948/92704* (2019.02); *B29C 2948/92876* (2019.02); *B29K 2027/16* (2013.01); *B29K 2027/18* (2013.01)

(56) References Cited

U.S. PATENT DOCUMENTS

| | | | |
|---|---|---|---|
| 8,252,406 B2* | 8/2012 | Schlipf | B29C 48/53 428/141 |
| 2001/0031330 A1 | 10/2001 | Ito et al. | |
| 2003/0069367 A1* | 4/2003 | Albe | C08F 8/50 525/387 |
| 2009/0045551 A1 | 2/2009 | Suetsugu et al. | |

FOREIGN PATENT DOCUMENTS

| | | | |
|---|---|---|---|
| JP | 07-009526 A | 1/1995 | |
| JP | 10-230541 A | 9/1998 | |
| JP | 2001-179798 A | 7/2001 | |
| JP | 2007-176168 A | 7/2007 | |
| JP | 2008-229967 A | 10/2008 | |
| JP | 2009-095978 A | 5/2009 | |
| JP | 2010-131962 A | 6/2010 | |
| JP | 2012-189173 A | 10/2012 | |
| JP | 2013-203070 A | 10/2013 | |
| JP | 2018-039137 A | 3/2018 | |
| WO | WO-2016158789 A1 * | 10/2016 | ........... B29C 48/252 |

OTHER PUBLICATIONS https://web.archive.org/web/20010716093133/https://www.efunda.com/materials/polymers/properties/polymer_datasheet.cfm?MajorID=FP&MinorID=2 (Year: 2001).*
International Search Report for PCT/JP2019/022595 dated Sep. 10, 2019 [PCT/ISA/210].
International Preliminary Report on Patentability issued Jan. 26, 2021 with English translation of the Written Opinion in International Application No. PCT/JP2019/022595.
Extended European Search Report issued Feb. 22, 2022 in European Application No. 19842230.5.

* cited by examiner

MOLDED RESIN BODY PRODUCTION METHOD

CROSS REFERENCE TO RELATED APPLICATIONS

This application is a National Stage of International Application No. PCT/JP2019/022595 filed Jun. 6, 2019, claiming priority based on Japanese Patent Application No. 2018-140158 filed Jul. 26, 2018.

TECHNICAL FIELD

The disclosure relates to methods for producing resin molded articles.

BACKGROUND ART

Resin has been conventionally molded by methods such as extrusion molding.

For example, Patent Literature 1 discloses (1) a method for extruding a thermoplastic resin from single-screw extruder at high speed, including the steps of connecting a gear pump on the discharge side of the extruder and extruding a thermoplastic resin with a die by passing the resin from the extruder through the gear pump, wherein the screw has (i) a diameter D of 30 to 150 mm and (ii) a ratio L/D of the length L to the diameter D of 20 to 40, and (iii) the extruder is provided with a first extruding section including, in the order from a side for feeding resin to a side for extruding resin, a feeding portion, a compression portion, and a weighing portion and is further provided with, in the order from the first extruding section to the side for extruding resin, a mixing portion, a shearing portion, and a second extruding section. At least ½ of the length of the second extruding section satisfies y≥(0.046x+1), wherein y is the groove depth (mm) of the second extruding section and x is the screw diameter (mm) of the second extruding section. The resin is melt extruded with this single screw rotated at a circumferential speed of 70 to 170 m/min.

Patent Literature 2 discloses a method for controlling a composite extrusion molding apparatus provided with a quantitative feeder that feeds a raw material into the extruder with quantitative control, an extruder fed with the raw material from the quantitative feeder, a gear pump connected to the extrusion side of the extruder, and a filter disposed at at least one of an inlet side or an outlet side of the gear pump. The method includes detecting an inlet pressure P1 and an outlet pressure P2 of the gear pump to determine the differential pressure, controlling the supply amount of the quantitative feeder based on the differential pressure, and controlling a gear pump drive motor such that the inlet pressure P1 of the gear pump has a predetermined pressure.

Patent Literature 3 discloses an apparatus for producing a resin molded article, including an extruder provided with a cylinder containing a screw, and a hopper provided above a feed end of the extruder. The hopper has a pressure-resistant structure and holds the pressure of high-pressure non-reactive gas to be introduced into the hopper. The apparatus further includes a gas supply device that is connected to the extruder and supplies high pressure non-reactive gas to a predetermined position in the cylinder of the extruder, and a drive device. The drive shaft of the screw connected to the drive device is sealed by viscous fluid.

Patent Literature 4 discloses a method for producing a purified fluororesin, including a step of bringing a melt-fabricable fluororesin in a heated and molten state into contact with a devolatilization aid, wherein the step includes dispersing the devolatilization aid in the heated and melted fluororesin.

CITATION LIST

Patent Literature

Patent Literature 1: JP H04-059220 A
Patent Literature 2: JP H06-328546 A
Patent Literature 3: JP H10-230541 A
Patent Literature 4: JP 2009-095978 A

SUMMARY OF INVENTION

Technical Problem

The disclosure aims to provide a method for producing a resin molded article, capable of reducing deterioration of resin during melt extrusion.

Solution to Problem

The disclosure relates to a method for producing a resin molded article using a molding machine provided with a hopper for resin, an extruder, and a pressure control device in this order, the method comprising:
  passing the resin fed from the hopper through the molding machine to produce the resin molded article,
  a resin pressure between a tip of the extruder and an inlet port for resin of the pressure control device being 15.0 MPa or lower.

In the production method of the disclosure, a resin temperature between the tip of the extruder and the inlet port for resin of the pressure control device is preferably 150° C. to 400° C.

In the production method of the disclosure, a percentage between a melt flow rate of the resin to be fed into the hopper and a melt flow rate of the resin of the resin molded article obtained is preferably 50% or lower, the melt flow rates being measured under same conditions.

The resin is preferably a thermoplastic fluororesin.

In the production method of the disclosure, a member that constitutes the pressure control device and is to be in contact with the resin preferably contains a material having a mass reduction amount of 3 mg/cm$^2$ or less after immersion in 5 mol/L hydrofluoric acid at 100° C. for 100 hours.

The pressure control device is preferably a gear pump.

The resin molded article is preferably in the form of pellets.

Advantageous Effects of Invention

The production method of the disclosure has the above structure and thus can reduce deterioration of resin during melt extrusion.

DESCRIPTION OF EMBODIMENTS

Figure 1:
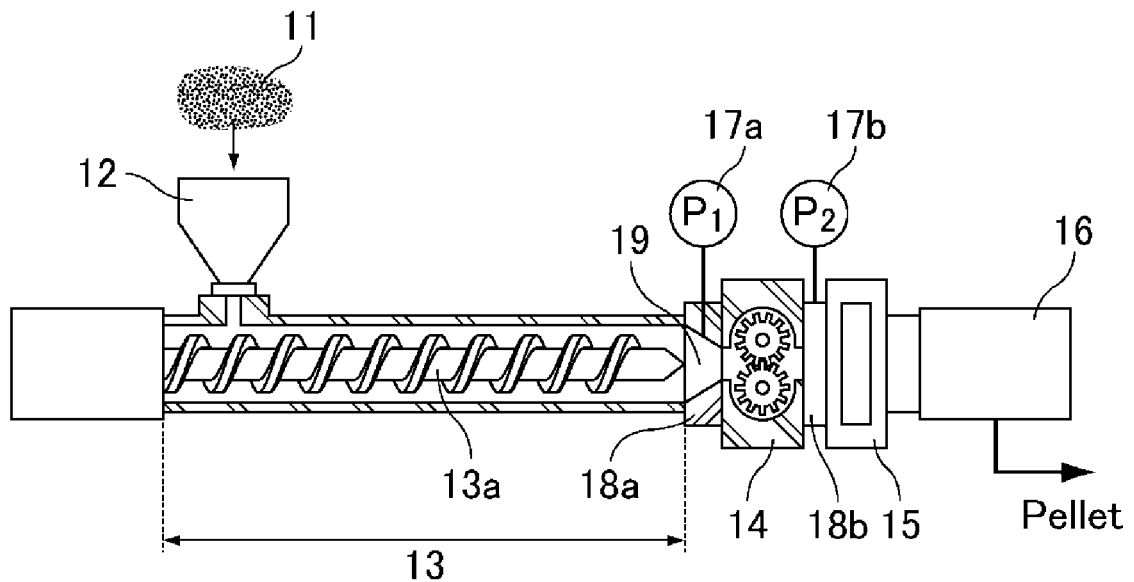
FIG. 1 is a figure schematically showing an example of a molding machine used in the production method of the disclosure.

In a conventional extruder for producing resin molded articles, resin is molded with a screw in the extruder, which transports the resin and applies a shear force to the resin. However, the inventors found that deterioration of resin is caused by an increase in resin pressure at the tip of the extruder and a further increase in shear stress by the screw to the pressure-increased resin.

The inventors conducted intensive studies to find that provision of a pressure control device at the tip of an extruder and control of the resin pressure between the tip of the extruder and the inlet port for resin of the pressure control device within a specific range can reduce deterioration of resin, and thereby succeeded in developing the production method of the disclosure.

The method for producing a resin molded article of the disclosure is specifically described below.

The production method of the disclosure includes passing a resin fed from a hopper for resin through a molding machine provided with the hopper, an extruder, and a pressure control device in this order, to produce a resin molded article.

The molding machine may include other member (s) according to need.

The hopper for resin is connected to the extruder and feeds the extruder with resin. The hopper for resin may have any shape, size, material, and the like, and a conventionally known hopper is available.

The hopper for resin and the extruder may be directly connected or may be connected with a member such as an adaptor.

The extruder simultaneously kneads and transports resin. The extruder may be one that can transport resin keeping the fluidity thereof. The extruder can be prepared by connecting multiple cylinders, for example. Setting extrusion screws (flight screws) in the cylinders enables simultaneous kneading and transportation of resin.

In the production method of the disclosure, one extruder may be used, or a device with multiple extruders connected may be used.

The extruder may include vent holes in order to remove volatile components produced during melting of resin.

The extruder is preferably a screw extruder.

Examples of the screw extruder include uniaxial extruders and biaxial extruders. Preferred among these are biaxial extruders in terms of self-cleaning and in the point that setting a screw appropriate to the application tends to form a melt seal and that a small residence-time distribution enables continuous operation, for example.

The screw of a biaxial extruder can be prepared by appropriately selecting and combining screw elements. Examples of the screw elements include a kneading disk that has a capability of transporting resin to the feeding direction and has a dispersing, mixing, and kneading function; a kneading disk that does not have a capability of transporting resin to the feeding direction nor to the returning direction but has a dispersing, mixing, and kneading function (for example, shown in FIGS. 7 and 8 and in the examples of JP 2002-120271 A); a back kneading disk that has a capability of transporting resin to the returning direction and has a dispersing, mixing, and kneading function (for example, shown in FIGS. 2, 3, 9, and 10 and in the examples of JP 2002-120271 A); a seal ring that can dam resin (for example, a seal ring disclosed in JP H07-124945 A); and a reverse flight screw (for example, shown in FIGS. 11 and 12 and in the examples of JP 2002-120271 A).

In the production method of the disclosure, the screw rotation speed of the extruder is not limited and may be appropriately set according to the resin used, the capacity of the extruder, and the like. For example, it is preferably in the range of 50 to 1000 rpm.

The pressure control device may be a device that controls the pressure of the resin before and after the pressure control device by including an inlet port for resin and an outlet port for resin, taking resin transported by the extruder from the inlet port for resin, passing the resin through the device, and discharging the resin from the outlet port for resin.

The pressure control device and the extruder may be directly or indirectly connected. Preferably, they are directly connected.

The pressure control device may be any device that can control pressure, and examples thereof include a gear pump and a melt pump, with a gear pump being preferred in terms of precise control of resin pressure.

In the pressure control device, a member to be in contact with resin preferably includes a material having a mass reduction amount of 3 $mg/cm^2$ or less after immersion in 5 mol/L hydrofluoric acid at 100° C. for 100 hours.

Examples of the material include an alloy of nickel and a metal such as molybdenum, chromium, or iron; an alloy of nickel and a metal such as iron, chromium, niobium, or molybdenum; and an alloy mainly containing nickel and copper. Specific examples thereof include hastelloy®, inconel®, and monel®.

Use of such a member achieves safe production of resin molded articles with high quality even when high-temperature melt resin is transported into the pressure control device.

A pressure control device including such a member is particularly effective in the case of using a resin requiring melting at high temperature, such as fluororesin, and in the case of using a resin possibly producing hydrofluoric acid during extrusion.

The member to be in contact with resin varies according to the type of the pressure control device. When the pressure control device is a gear pump, examples of the member include the gear of the gear pump, the container containing the gear, and the inner wall of the container.

In the production method of the disclosure, the resin pressure between the tip of the extruder and the inlet port for resin of the pressure control device is 15.0 MPa or lower. Controlling the resin pressure to 15.0 MPa or lower can reduce deterioration of resin caused by the shear stress, pressure, and temperature applied by the extrusion screw or the like at the tip of the extruder (at the tip on the pressure control device side).

The resin pressure at the inlet port for resin is preferably 13.0 MPa or lower, more preferably 12.0 MPa or lower, still more preferably 10.0 MPa or lower, further more preferably 8.0 MPa or lower, especially preferably 5.0 MPa or lower, particularly preferably 4.0 MPa or lower, particularly more preferably 2.0 MPa or lower, particularly still more preferably 1.5 MPa or lower, most preferably 1.0 MPa or lower. The lower limit of the resin pressure is not limited, and is usually 0.01 MPa or higher. The resin pressure may be 0.05 MPa or higher, or may be 0.1 MPa or higher.

The resin pressure can be measured by, for example, setting a high-temperature corrosion-resistant diaphragm pressure gauge in an adaptor connecting the extruder and the inlet port for resin of the pressure control device.

In the production method of the disclosure, usually, resin is melted in the extruder and is then passed through the extruder. The temperature of the extruder may be appropriately set according to the type of the resin used, and may be 100° C. to 400° C., for example. As described later, when a melt-fabricable fluororesin is used, the temperature is preferably 280° C. to 400° C. The extruder preferably includes a heating system that can heat resin to a temperature that allows melting of resin.

In the pressure control device, the resin temperature between the tip of the extruder and the inlet port for resin of the pressure control device is preferably 150° C. to 400° C. Usually, resin is remarkably deteriorated at high temperatures. The production method of the disclosure can fortunately reduce deterioration of resin even when using resin in the above resin temperature range. The resin temperature is more preferably 180° C. or higher, still more preferably 200° C. or higher, further more preferably 220° C. or higher, especially preferably 240° C. or higher, particularly preferably 260° C. or higher, particularly still more preferably 280° C. or higher, most preferably 290° C. or higher. The production method of the disclosure is particularly suitable for production at such resin temperature.

The resin temperature can be measured by, for example, setting a thermocouple thermometer in an adaptor connecting the extruder and the inlet port for resin of the pressure control device.

In the production method of the disclosure, a percent change between a melt flow rate of the resin to be fed into the hopper and a melt flow rate of the resin of the resin molded article is preferably 50% or lower, where the melt flow rates are measured under the same conditions. The percent change is more preferably 40% or lower, still more preferably 30% or lower, particularly preferably 20% or lower.

When deterioration such as decomposition is caused by extrusion molding, the MFR of the resin formed into a resin molded article usually becomes higher than that of the resin to be fed into the hopper for resin. Fortunately, the production method of the disclosure can reduce deterioration of resin and thus can reduce the MER change. Accordingly, the MFR of the resin formed into a resin molded article is usually higher than the MFR of the resin to be fed into the hopper for resin.

The production method of the disclosure is also useful in the point that the MER of resin can be adjusted by adjusting the driving speed of the gear pump or the like.

The MFR may be measured in any conditions allowing melting of resin and may be appropriately set according to the type of the resin. For example, when PFA or FEP described later is used as the resin, the MFR thereof is measured with a die having a diameter of 2.1 mm and a length of 8 mm at a load of 5 kg and a temperature of 372° C. in accordance with ASTM D-3307.

When ETFE is used as the resin, the MFR thereof is measured with a die having a diameter of 2.1 mm and a length of 8 mm at a load of 5 kg and a temperature of 297° C. in accordance with ASTM D-3159.

In the production method of the disclosure, the resin pressure between the tip of the extruder and the inlet port for resin of the pressure control device is preferably lower than the resin pressure at the outlet port for resin of the pressure control device. Also, the pressure difference between the resin pressure between the tip of the extruder and the inlet port for resin of the pressure control device and the resin pressure at the outlet port for resin of the pressure control device is preferably 1.0 MPa or higher, more preferably 2.0 MPa or higher, still more preferably 3.0 MPa or higher, further more preferably 3.5 MPa or higher, particularly preferably 4.0 MPa or higher.

The resin pressure between the tip of the extruder and the inlet port for resin can be measured by the above described method.

The resin pressure at the outlet port for resin can be measured by, for example, setting a high-temperature corrosion-resistant diaphragm pressure gauge in an adaptor connected to the outlet port for resin of the pressure control device.

In the production method of the disclosure, the extrusion speed of resin is not limited as long as the resin pressure at the inlet port for resin of the pressure control device is 15.0 MPa or lower and may be appropriately set according to the sizes of the extruder and pressure control device and the like.

The production method of the disclosure having the above structure enables to increase the feeding amount of resin, that is, the deterioration of resin can be reduced even when the extrusion speed is increased, and thus the productivity is improved. In terms of productivity, for example, the extrusion speed of resin is preferably an extrusion speed with the following extrusion speed coefficient Z being 0.01 kg/(hr×mm$^2$) or higher, more preferably 0.02 kg/(hr×mm$^2$) or higher, still more preferably 0.03 kg/(hr×mm$^2$) or higher. The extrusion speed coefficient Z is an extrusion speed coefficient for the cross-sectional area of the extruder and is represented by the following formula.

Extrusion speed coefficient $Z=Q/D^2$

Q: extrusion speed (kg/hr)

D: diameter (mm) of cylinder in extruder

Also, in the production method of the disclosure, the extrusion speed may be an extrusion speed with the extrusion speed coefficient Z being 0.04 kg/(hr×mm$^2$) or higher, or 0.05 kg/(hr×mm$^2$) or higher.

As described above, controlling the resin pressure at the inlet port for resin of the pressure control device or controlling both the resin pressures at the inlet port for resin and at the outlet port for resin can reduce deterioration of resin. The disclosure also provides a method for controlling extrusion molding, including performing extrusion molding by controlling the driving speed of a pressure control device and thereby controlling the pressure at the inlet port for resin and/or the pressure at the outlet port for resin of the pressure control device.

The molding machine used in the production method of the disclosure preferably includes a die for forming resin.

The die is disposed on the side of the outlet port for resin of the pressure control device.

The die may have a desired shape according to the shape of an intended molded article and may be a conventionally known one. When pellets are produced as resin molded articles, a die provided with a pelletizer may be used.

The pressure control device and the die may be directly or indirectly connected. In the molding machine used in the production method of the disclosure, for example, a screen filter may be provided between the pressure control device and the die. Use of a screen filter tends to increase the resin pressure at the extruder tip. Thereby, the effect of the production method of the disclosure is more remarkably exhibited.

Examples of the resin used in the production method of the disclosure include thermoplastic resins. Examples of the thermoplastic resins include non-fluorine resins and fluororesins.

Examples of the non-fluorine resins include general-purpose resins such as polyethylene resin, polypropylene resin, vinyl chloride resin, and polystyrene resin; and engineering plastics such as nylon, polycarbonate, polyether ether ketone resin, and polyphenylene sulfide resin.

The resin is preferably a thermoplastic fluororesin. Fluororesins need to be molded at a temperature higher than the temperature for molding non-fluorine resins such as polyethylene, which presumably tends to cause deterioration of resin at the extruder tip. In other words, the production method of the disclosure is more suitable when the resin is a thermoplastic fluororesin.

The melt flow rate (MFR) of the thermoplastic fluororesin to be fed into the hopper for resin is not limited but is preferably 0.5 to 70 g/10 min, more preferably 15 g/10 min or lower, still more preferably 8 g/10 min or lower, while more preferably 5 g/10 min or lower, still more preferably 3 g/10 min or lower. The MFR may be measured under the conditions that allow melting of fluororesin and may be appropriately set according to the type of the fluororesin. For example, the MFRs of resins such as PFA, FEP, and ETFE may be measured under the above described conditions.

The thermoplastic fluororesin may be a melt-fabricable fluororesin, and examples thereof include TFE/HEP copolymers (FEPs) such as a tetrafluoroethylene (TFE)/hexafluoropropylene (HFP) copolymer and a TFE/HFP/perfluoro (alkyl vinyl ether) copolymer (PAVE); tetrafluoroethylene/PAVE copolymers (PFAs) such as a TFE/perfluoro (methyl vinyl ether) (PMVE) copolymer (MFA) and a TFE/perfluoro (propyl vinyl ether) (PPVE) copolymer; a vinylidene fluoride homopolymer (PVdF); a TFE/ethylene copolymer (ETFE); and a chlorotrifluoroethylene homopolymer (PCTFE). The thermoplastic fluororesin may be a polymer obtained by copolymerizing any of the above mentioned polymers with different monomer (s). Specific examples thereof include a TFE/HFP/PAVE copolymer, an ethylene/TFE/hexafluoropropylene copolymer, and a chlorotrifluoroethylene/TFE/PAVE copolymer.

The fluororesin is preferably a polymer containing a polymerized unit based on TFE, more preferably a perfluoropolymer containing a perfluoro monomer as a monomer constituting a main chain, still more preferably at least one selected from the group consisting of FEP and PFA.

The FEP preferably has a mass ratio TFE/HFP of 80 to 97/3 to 20, more preferably 84 to 92/8 to 16. The TFE/HFP copolymer may be a binary copolymer consisting of TFE and HFP or may be a ternary copolymer consisting of TFE, HEP, and a comonomer copolymerizable with TFE and HFP (e.g., TFE/HFP/PAVE copolymer). The TFE/HFP copolymer is also preferably a TFE/HFP/PAVE copolymer containing a polymerized unit based on PAVE. The TFE/HFP/PAVE copolymer preferably has a mass ratio TFE/HFP/PAVE of 70 to 97/3 to 20/0.1 to 10, more preferably 81 to 92/5 to 16/0.3 to 5.

The PFA preferably has a mass ratio TFE/PAVE of 90 to 99/1 to 10, more preferably 92 to 97/3 to 8.

Examples of the PAVE include perfluoro (methyl vinyl ether) (PMVE), perfluoro (ethyl vinyl ether) (PEVE), and perfluoro (propyl vinyl ether) (PPVE), with PPVE being preferred.

The ETFE preferably has a mole ratio TFE/ethylene of 20 to 80/20 to 80, more preferably 40 to 65/35 to 60. The ETFE may contain a different monomer.

In other words, the ETFE may be a binary copolymer consisting of TFE and ethylene or may be a ternary copolymer consisting of TFE, ethylene, and a comonomer copolymerizable with TFE and ethylene (e.g., a TFE/ethylene/HFP copolymer).

The ETFE is also preferably a TFE/ethylene/HFP copolymer containing a polymerized unit based on HFP. The TFE/ethylene/HFP copolymer preferably has a mole ratio TFE/ethylene/HFP of 40 to 65/30 to 60/0.5 to 20, more preferably 40 to 65/30 to 60/0.5 to 10.

The fluororesin may be polymerized by any conventionally known method such as solution polymerization, suspension polymerization, or emulsion polymerization. A fluoropolymer for heat melting is obtained by aggregating fluororesin particles dispersed in polymerized liquid, followed by filtering and drying. The polymerization may be performed at any polymerization temperature and at any polymerization pressure using a polymerization initiator of any type and at any concentration.

When the resin is a melt-fabricable fluororesin, fluorination treatment may be performed in an extruder. Fluorination treatment can be performed by, for example, bringing the fluororesin in the extruder in contact with a fluorinating agent. Fluorination treatment can convert any terminal group that can be fluorinated at a terminal of a fluororesin. Examples of the terminal group that can be fluorinated include a —COF group, a —COOH group (free or bonded), a —CH$_2$OH group, a —CONH$_2$ group, a —COOCH$_3$ group, a —CF$_2$H group, a —CF=CF— group, and a —CF=CF$_2$ group.

Examples of the fluorinating agent include fluorine-containing compounds such as F$_a$ gas, CoF$_3$, AgF$_2$, UF$_6$, OF$_2$, N$_2$F$_2$, CF$_3$OF, and halogen fluorides (e.g., IF$_5$ and ClF$_3$). The fluorinating agent is particularly preferably F$_2$ gas in terms of reaction efficiency. The reaction is particularly preferably a reaction in which a terminal group that can be fluorinated reacts with a fluorinating agent and is thereby converted into a —CF$_3$ group.

The temperature for the fluorination treatment may be appropriately set according to the amount and type of the fluororesin used, the type of the fluorinating agent used, and the like. In terms of reaction efficiency, the temperature is preferably 20° C. or higher, more preferably 80° C. or higher, while preferably 400° C. or lower, more preferably 380° C. or lower.

The amount of the fluorinating agent used in the fluorination treatment may be appropriately set according to the type and amount of the fluororesin used and the like and is, for example, preferably 100 ppm or more, more preferably 1000 ppm or more per kilogram of the fluororesin. The amount is preferably 20000 ppm or less, more preferably 10000 ppm or less.

In the fluorination treatment, a fluorinating agent mixed with inert gas may be used. For example, a mixed substance containing 10 to 90% by volume of the fluorinating agent and 10% to 90% of inert gas (e.g., N$_2$ gas, CO$_2$ gas, helium gas, and argon gas) may be used.

In the production method of the disclosure, the resin molded article may have any shape. For example, the production method more preferably provides pellets as the resin molded articles.

Hereinafter, the production method of the disclosure is more specifically described with reference to drawings.

A molding machine shown in FIG. 1 includes an extruder 13 provided with a hopper for resin 12 and a screw 13a, an adaptor 18a, a pressure control device (gear pump) 14, an adaptor 18b, a screen filter 15, and a die 16 provided with a pelletizer in this order. The adaptor 18a connects the extruder and an inlet port for resin of the pressure control device, and the adaptor 18b connects an outlet port for resin of the pressure control device and the screen filter. Resin 11 is fed from the hopper for resin 12 into the extruder 13 and is transported by the screw 13a to the gear pump side. The gear pump 14 can smoothly transport the resin to the die side. Accordingly, the resin pressure between the tip of the extruder and the pressure control device may be set to 15.0 MPa or lower, which can reduce deterioration of resin. When such a molding machine is used, the resin pressure between the tip of the extruder and the pressure control device can be measured by setting a pressure gauge in the adaptor 18a connecting the extruder and the inlet port for resin of the pressure control device.

Figure 2:
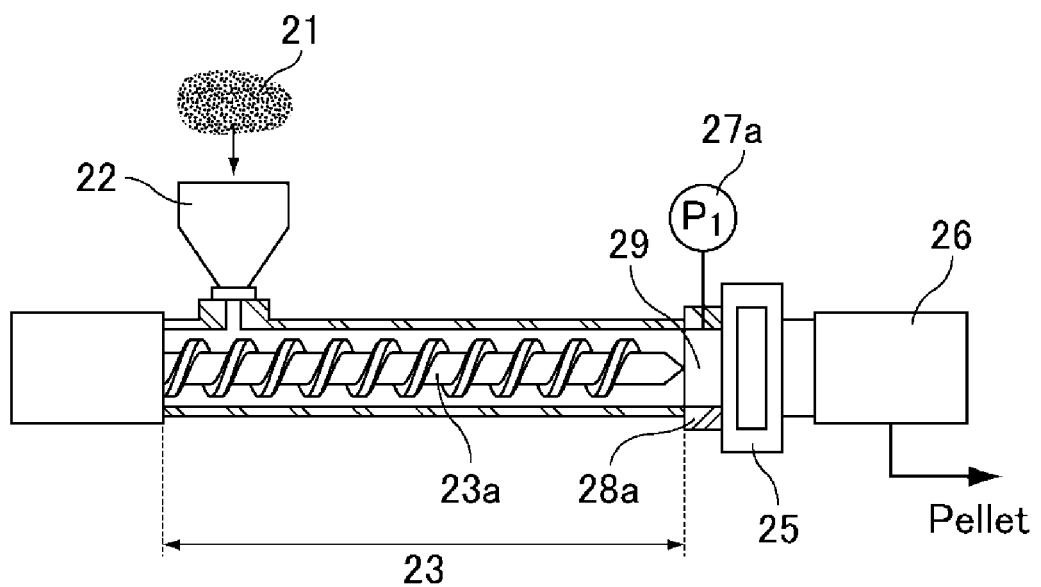
FIG. 2 is a figure schematically showing an example of a molding machine used in a conventional method.

FIG. 2 shows an example of the structure of a conventional molding machine. The molding machine shown in FIG. 2 includes an extruder 23 provided with a hopper for resin 22 and a screw 23a, an adaptor 28a, a screen filter 25, and a die 26 provided with a pelletizer in this order. The adaptor 28a connects the extruder and the screen filter. Resin 21 is fed from the hopper for resin 22 into the extruder 23 and is transported by the screw 23a to the screen filter 25 side. When the molding machine is not provided with a gear pump (pressure control device), the pressure before the screen filter 25 (e.g., the pressure measured with a pressure gauge 27a) unfortunately increases, which increases the resin pressure at the extruder tip and thereby tends to cause deterioration of resin.

EXAMPLES

The production method of the disclosure is described with reference to examples, but the examples are not intended to limit the production method of the disclosure.

The properties in the description were determined by the following methods.

Melt Flow Rate

The melt flow rates of fluororesins A to C were measured with a die having a diameter of 2.1 mm and a length of 8 mm at a load of 5 kg and a temperature of 372° C. in accordance with ASTM D-3307. The melt flow rate of fluororesin D was measured with a die having a diameter of 2.1 mm and a length of 8 mm at a load of 5 kg and a temperature of 297° C. in accordance with ASTM D-3159.

Resin Pressure Between Extruder Tip and Inlet Port of Gear Pump

The resin pressure was measured with a high-temperature corrosion-resistant diaphragm pressure gauge set onto the adaptor connecting the tip of the extruder (tip of cylinder 9) and the inlet port for resin of the gear pump.

Resin Pressure at Outlet Port for Resin of Gear Pump (Before Screen)

The resin pressure was measured with a high-temperature corrosion-resistant diaphragm pressure gauge set onto the adaptor connecting the outlet port for resin of the gear pump and the breaker plate provided with a screen.

Resin Temperature Between Extruder Tip and Inlet Port of Gear Pump

The resin temperature was measured with a thermocouple thermometer set in the adaptor connecting the tip of the extruder (tip of the ninth cylinder) and the inlet port for resin of the gear pump.

Resins used in the examples and comparative examples are as follows.

Fluororesin A: The resin was a TFE/PPVE copolymer synthesized as in Synthesis Example 5 of JP 5445699 B, except that the amount of methanol was changed to 0.12 parts.

Fluororesin B: The resin was a TFE/PPVE copolymer synthesized as in Synthesis Example 5 of JP 5445699 B.

Fluororesin C: The resin was a TFE/HFP copolymer synthesized as in Example 1 of JP S59-28211 B.

Fluororesin D: The resin was an ethylene/tetrafluoroethylene copolymer (an ethylene/TFE copolymer) prepared as in Example 4 of WO 2010/123002, except that the amount of cyclohexane before the reaction was changed to 0.3 kg and the amount of cyclohexane after 2.5 hours was changed to 100 g.

Example 1

A molding machine provided with a hopper for resin, a biaxial extruder including nine cylinders each having a diameter of 40 mm and a ratio L/D of 36, and a gear pump connected to the tip of the biaxial extruder was prepared. Fluororesin A was fed from the hopper for resin and extruded by passing the resin through the molding machine, whereby pellets were obtained.

The extrusion was performed by feeding pellets of fluororesin A at a speed of 30 kg/hr. The extrusion took 40 seconds.

The biaxial extruder used for extrusion had the following structure. The first cylinder serves as a raw material feeding portion, the second to sixth cylinders serve as a transportation and plasticization zone mainly constituted by feeding screws (right screws) (the second, third, and fifth cylinders provided with reversing screws (left screws) serve as a zone for completely melting powder or pellets with kneading disks to generate a back pressure by melt sealing), and the immediately following seventh cylinder is provided with vent holes for removing volatile components produced during melting. The seventh and following cylinders include feeding screws (right screws). An adaptor connects the tip of the ninth cylinder and the inlet port for resin of the gear pump (material of the gear and inner wall: inconel) capable of adjusting the pressure at the tip. On the side of the outlet port for resin of the gear pump, a breaker plate provided with three Ni screens, whose mesh sizes are 300 mesh (opening 0.045 mm), 100 mesh (opening 0.154 mm), and 20 mesh (opening 0.90 mm) from the extruder side, is attached by connecting with an adaptor. The breaker plate with screens is connected to a die provided with a pelletizer for forming pellets. Pellets are provided from the die.

The extrusion was performed at an extrusion temperature (cylinder temperature) of 380° C. and a screw rotation speed of 200 rpm. The rotation speed of the gear pump was adjusted such that the pressure at the side of the inlet port for resin of the gear pump was 0.1 MPa, and the MFR of resulting pellets was measured.

Example 2

Pellets were obtained as in Example 1, except that the extrusion speed and the screw rotation speed were changed.

Examples 3 to 18

Pellets were obtained as in Example 1, except that the fluororesin, the screw rotation speed, and the intake pressure conditions of the gear pump were changed according to Tables 1 to 3.

Comparative Example 1

Pellets were obtained as in Example 8, except that the gear pump at the tip of the biaxial extruder was removed, and a breaker plate with three Ni screens, whose mesh sizes were 300 mesh (opening 0.045 mm), 100 mesh (opening 0.154 mm), and 20 mesh (opening 0.90 mm), was attached at the tip of the extruder.

Since the pressure before the screens was out of control, the pressure naturally increased to 17 MPa and the resin temperature also increased to 470° C.

Comparative Example 2

Pellets were obtained as in Comparative Example 1, except that the resin raw material was changed according to Table 3.

TABLE 1

|  |  | Example 1 | Example 2 | Example 3 | Example 4 | Example 5 | Example 6 | Example 7 |
|---|---|---|---|---|---|---|---|---|
| Fluororesin as raw material |  | A | A | A | A | A | A | A |
| (Form of raw material) |  | (Pellet) | (Pellet) | (Pellet) | (Powder) | (Powder) | (Powder) | (Powder) |
| Gear pump |  | Present | Present | Present | Present | Present | Present | Present |
| MFR of raw material | g/10 min | 2.47 | 2.47 | 2.47 | 2.08 | 2.08 | 2.08 | 2.08 |
| MFR of pellet after extrusion | g/10 min | 2.41 | 2.36 | 2.47 | 2.08 | 2.12 | 2.13 | 2.26 |
| MFR percent change | ΔMFR % | −2.4% | −4.5% | 0.0% | 0.0% | 1.9% | 2.4% | 8.7% |
| Pressure between extruder tip and gear pump inlet port | MPa | 0.1 | 1.0 | 1.5 | 2.0 | 2.0 | 4.0 | 6.0 |
| Pressure at gear pump outlet port (pressure before screen) | MPa | 9.0 | 12.8 | 13.4 | 10.8 | 0.8 | 10.7 | 10.7 |
| Resin temperature between extruder tip and gear pump inlet port | ° C. | 386 | 383 | 384 | 384 | 393 | 393 | 404 |
| Screw speed | rpm | 200 | 330 | 540 | 340 | 340 | 340 | 340 |
| Extrusion speed | kg/hr | 30 | 160 | 160 | 160 | 160 | 160 | 160 |
| Cylinder temperature | ° C. | 380 | 380 | 380 | 380 | 400 | 400 | 400 |

TABLE 2

|  |  | Example 8 | Example 9 | Example 10 | Example 11 | Example 12 | Comparative Example 1 |
|---|---|---|---|---|---|---|---|
| Fluororesin as raw material |  | A | A | A | A | A | A |
| (Form of raw material) |  | (Powder) | (Powder) | (Powder) | (Powder) | (Powder) | (Powder) |
| Gear pump |  | Present | Present | Present | Present | Present | Absent |
| MFR of raw material | g/10 min | 2.08 | 2.08 | 2.08 | 2.08 | 2.08 | 2.08 |
| MFR of pellet after extrusion | g/10 min | 2.09 | 2.05 | 2.1 | 2.09 | 2.33 | 7.86 |
| Percent change | ΔMFR % | 0.5% | −1.4% | 1.0% | 0.5% | 12.0% | 277.9% |
| Pressure between extruder tip and gear pump inlet port | MPa | 2.0 | 4.0 | 6.0 | 8.0 | 10.0 | *(17.0) |
| Pressure at gear pump outlet port (pressure before screen) | MPa | 11.2 | 11.0 | 10.9 | 10.7 | 6.9 | — |
| Resin temperature between extruder tip and gear pump inlet port | ° C. | 394 | 395 | 396 | 395 | 395 | 470 |
| Screw speed | rpm | 540 | 540 | 540 | 540 | 540 | 540 |
| Extrusion speed | kg/hr | 160 | 160 | 160 | 160 | 60 | 160 |
| Cylinder temperature | ° C. | 400 | 400 | 400 | 400 | 400 | 400 |

*The parenthesized number in the box of "Pessure between extruder tip and gear pump inlet port" in Comparative Example 1 indicates the pressure between extruder tip and screen.

TABLE 3

|  |  | Example 13 | Example 14 | Example 15 | Example 16 | Comparative Example 2 | Example 17 | Example 18 |
|---|---|---|---|---|---|---|---|---|
| Fluororesin as raw material |  | B | B | B | B | B | C | D |
| (Form of raw material) |  | (Powder) | (Powder) | (Powder) | (Pellet) | (Powder) | (Powder) | (Powder) |
| Gear pump |  | Present | Present | Present | Present | Absent | Present | Present |
| MFR of raw material | g/10 min | 1.59 | 1.59 | 1.59 | 1.6 | 1.59 | 1.21 | 1.9 |

TABLE 3-continued

|  |  | Example 13 | Example 14 | Example 15 | Example 16 | Comparative Example 2 | Example 17 | Example 18 |
|---|---|---|---|---|---|---|---|---|
| MFR of pellet after extrusion | g/10 min | 1.66 | 1.82 | 1.92 | 1.76 | 18.56 | 1.45 | 2.05 |
| Percent change | ΔMFR % | 4.4% | 14.5% | 20.8% | 10.0% | 1067.3% | 19.8% | 7.9% |
| Pressure between extruder tip and gear pump inlet port | MPa | 2.0 | 4.0 | 6.0 | 2.0 | *(25.9) | 2.0 | 2.0 |
| Pressure at gear pump outlet port (pressure before screen) | MPa | 11.8 | 11.4 | 11.3 | 11.6 | — | 12.0 | 11.8 |
| Resin temperature between extruder tip and gear pump inlet port | °C. | 403 | 405 | 408 | 405 | 472 | 388 | 330 |
| Screw speed | rpm | 540 | 540 | 540 | 540 | 540 | 540 | 540 |
| Extrusion speed | kg/hr | 160 | 160 | 160 | 160 | 120 | 160 | 160 |
| Cylinder temperature | °C. |  | 400 | 400 | 400 | 400 | 390 | 320 |

*The parenthesized number in the box of "Pessure between extruder tip and gear pump inlet port" in Comparative Example 2 indicates the pressure between extruder tip and screen.

INDUSTRIAL APPLICABILITY

The production method of the disclosure is applicable to production of a resin molded article.

REFERENCE SIGNS LIST

11, 21: Resin
12, 22: Hopper for resin
13, 23: Extruder
13a, 23a: Screw
14: Pressure control device (gear pump)
15, 25: Screen filter
16, 26: Die provided with pelletizer
17a, 17b, 27a: Pressure gauge
18a: Adaptor connecting extruder and inlet port for resin of pressure control device
18b: Adaptor connecting outlet port for resin of pressure control device and screen filter
28a: Adaptor connecting extruder and screen filter
19, 29: Flow route from extruder tip to inlet port for resin of pressure control device

The invention claimed is:

1. A method for producing a resin molded article using a molding machine provided with a hopper for resin, an extruder, and a pressure control device in this order, the method comprising:
feeding the resin into the hopper;
passing the resin fed from the hopper through the molding machine to produce the resin molded article, and
adjusting a resin pressure between a tip of the extruder and an inlet port for resin of the pressure control device to be 15.0 MPa or lower with the pressure control device, such that, through the adjustment of the resin pressure by the pressure control device a percent change between a melt flow rate of the resin fed into the hopper and a melt flow rate of the resin of the resin molded article obtained is 50% or lower,
wherein the melt flow rates are measured under the same conditions, and
the resin is a thermoplastic fluororesin.

2. The production method according to claim 1, wherein a resin temperature between the tip of the extruder and the inlet port for resin of the pressure control device is 150° C. to 400° C.

3. The production method according to claim 1, wherein the pressure control device is a gear pump or a melt pump, and a member that constitutes the pressure control device and is in contact with the resin contains a material having a mass reduction amount of 3 mg/cm² or less after immersion in 5 mol/L hydrofluoric acid at 100° C. for 100 hours.

4. The production method according to claim 1, wherein the pressure control device is a gear pump.

5. The production method according to claim 1, wherein the resin molded article is in a form of pellets.

6. The production method according to claim 1, where the resin pressure between the tip of the extruder and the inlet port for resin of the pressure control device is 10.0 MPa or lower.

7. The production method according to claim 1, wherein the resin pressure between the tip of the extruder and the inlet port for resin of the pressure control device is lower than a resin pressure at the outlet port for resin of the pressure control device.

8. The production method according to claim 1, further comprising adjusting a driving speed of the pressure control device, thereby reducing a percent change between a melt flow rate of the resin fed into the hopper and a melt flow rate of the resin of the resin molded article obtained.

* * * * *